United States Patent [19]
Sampson

[11] Patent Number: 5,142,938
[45] Date of Patent: Sep. 1, 1992

[54] BICYCLE CLEAT AND PEDAL WITH ADJUSTABLE FLOATING RELATIONSHIP

[75] Inventor: Eric A. Sampson, Denver, Colo.

[73] Assignee: Sampson Sports, Inc., Denver, Colo.

[21] Appl. No.: 719,690

[22] Filed: Jun. 25, 1991

Related U.S. Application Data

[62] Division of Ser. No. 398,819, Aug. 25, 1989, abandoned.

[51] Int. Cl.[5] .......................... G05G 1/14; A43B 5/00
[52] U.S. Cl. .................. 74/594.6; 74/594.4; 36/131
[58] Field of Search ............... 36/131, 132; 74/594.6, 74/594.4, 617X

[56] References Cited

U.S. PATENT DOCUMENTS

| | | | |
|---|---|---|---|
| 573,751 | 12/1896 | Anderson | 74/617 |
| 4,686,867 | 8/1987 | Bernard et al. | 74/594.6 |
| 4,815,333 | 3/1989 | Sampson | 74/594.6 |
| 4,864,887 | 9/1989 | Rapisarda | 74/594.6 |
| 4,890,507 | 1/1990 | Farris et al. | 36/131 |
| 4,898,063 | 2/1990 | Sampson | 36/131 |
| 4,898,064 | 2/1990 | Romano | 36/131 |
| 4,899,618 | 2/1990 | Christor | 74/594.6 |
| 4,928,549 | 5/1990 | Nagano | 74/594.6 |
| 4,969,375 | 11/1990 | Osten Sacken et al. | 74/594.6 |
| 5,027,675 | 7/1991 | McCune et al. | 74/594.4 X |
| 5,048,369 | 9/1991 | Chen | 74/594.6 |
| 5,081,883 | 1/1992 | Romano | 36/131 X |

FOREIGN PATENT DOCUMENTS

| | | | |
|---|---|---|---|
| 3507735 | 9/1986 | Fed. Rep. of Germany | 74/594.6 |
| 2279607 | 2/1976 | France | 74/594.6 |
| 2209717 | 5/1989 | United Kingdom | 36/131 |

*Primary Examiner*—Vinh T. Luong
*Attorney, Agent, or Firm*—Rothgerber, Appel, Powers & Johnson

[57] ABSTRACT

Torsional stress of a cyclist's leg is minimized by providing spaced limit surfaces on opposing parts of a cycle pedal and a shoe cleat that are designed for step-in, twist-out engagement. Floating adjusters, in the form of threaded rods, are rotated to select the effective width of spaces between the spaced limit surfaces. The full width of the space allows full floating rotation of the cleat relative to the pedal, whereas adjustment of the rods selects smaller floating rotating of the cleat relative to the pedal. The spaced limit surfaces and the rods are provided in LOOK and SAMPSON types of step-in, twist-out pedals.

18 Claims, 6 Drawing Sheets

BICYCLE CLEAT AND PEDAL WITH ADJUSTABLE FLOATING RELATIONSHIP

REFERENCE TO PRIOR APPLICATION

This application is a division of applicant's copending application Ser. No. 07/398,819 filed Aug. 25, 1989, entitled BICYCLE CLEAT AND PEDAL WITH ADJUSTABLE FLOATING RELATIONSHIP now abandoned.

FIELD OF THE INVENTION

This invention relates to pedals and mating cleats for cycles and more particularly to providing adjustable floating movement between a cleat worn by a cyclist and the pedal of the cycle.

BACKGROUND OF THE INVENTION

In the past, efforts have been made to increase the efficiency of cycles such as self-powered bicycles. These efforts have included improvements to the pedals that transmit force from the cyclist's foot to the axle that drives the crank arm. Such improved pedals coact with a cleat on the cyclist's shoe to efficiently receive downward force, upward force and forward and backward forces from the cleat. Another object of such pedals has been to provide ease of engagement of the cleat with the pedal, yet allow controlled release from the pedal. One type of pedal engagement/release is referred to as a "step-in, twist-out" pedal.

There are two design variations of the step-in, twist-out pedal. In pedals sold under the LOOK and KEEWIN trademarks, the cyclist's foot is held securely on the top surface of the pedal. Proponents of this design contend that when the cyclist's feet are correctly aligned on the pedals, the pedals deliver full force to the crank arm, but do not hurt the cyclist's legs.

The other basic philosophy of step-in twist-out pedals is that the cyclist's foot should be allowed to rotate freely on the top of the pedal. This is intended to allow the cyclist's leg to constantly twist or adjust its position around a vertical axis while pedalling, and avoid torsional stress on the knee joint in particular. These designs are sold under the trademarks AVENIR and TIME.

In the step-in, twist-out pedal designs that allow free rotation of the foot on the pedal, a pocket or recess is provided in the pedal and is larger than the corresponding projections of the cleat. In this manner, without actuating any detent that normally secures the cleat to the pedal, the cleat can rotate torsionally (in a generally horizontal plane around a generally vertical axis) to permit the cyclist's lower leg to freely rotate with the cyclist's upper leg. Such free or loose torsional movement of the cyclist's shoe cleat (and foot) relative to the pedal is commonly referred to as "floating."

Some of the step-in, twist-out pedals that provide a tight, yet releasable mating of the pedal with a shoe cleat, allow little if any torsional motion of the cleat on the top surface of the pedal before the release occurs or starts to occur. This is shown, for example, in U.S. Pat. No. 4,815,333, issued on Mar. 28, 1989, and invented by Applicant. In that SAMPSON pedal system, front and rear surfaces of the cleat are designed to mate with correspondingly shaped front and rear surfaces of the pedal. The mating surfaces tightly engage each other to transmit upward, downward and forward/backward forces from the shoe cleat to the pedal. These mating surfaces do not prevent movement of the cleat relative to the pedal around a vertical axis. However, such torsional movement is resisted by a spring-biased detent, such that the normal twisting force transmitted through the cyclist's knee to the cyclist's foot is resisted, which exerts torsional stress on the cyclist's knee. Thus, in the LOOK, KEEWIN and SAMPSON types of step-in, twist-out pedal designs, the cyclist's knee may be subject to torsional stress during pedaling.

SUMMARY OF THE PRESENT INVENTION

Applicant's studies of the above-described loose floating engagement between such step-in, twist-out pedals indicates that substantial numbers of cyclists have become accustomed to the cleat-pedal engagement in which there is a tight torsional mating engagement between the cleat and the pedal. In those cleats and pedals, such floating is not permitted. Applicant's studies also indicate that the amount of looseness of the freely floating cleat-pedal mating engagement is generally determined by the cleat or pedal manufacturer, such that there can be relatively wide variations in the amount of space between the mating surfaces of the cleat and the pedal that are designed to freely float relative to each other. This adds to the discomfort of the cyclist's who are accustomed to the tight torsional cleat-pedal mating engagement. As a result, there is substantial resistance by cyclists to adopt the freely floating cleat-pedal mating engagement, even though some analyses indicate that it may result in less torsional stress on the cyclist's knee joint.

Applicant's studies indicate that these problems can be minimized and cyclists can be encouraged to adopt the pedal systems with freely floating cleat-pedal mating engagement by providing adjustable floating under the control of the cyclist. Such adjustable floating is preferably provided on the rear cleat-pedal mating surfaces. In this manner, the amount of floating, or torsional movement, of the cleat relative to the pedal is not dependent on the manufacturing tolerances for the cleat and the pedal, but may be adjusted according to the cyclist's preference, which may depend on the amount of twisting of the cyclist's leg during pedalling.

OBJECTS OF THE PRESENT INVENTION

An object of the present invention is to provide adjustable floating engagement between a cyclist's shoe cleat and a cycle pedal.

Another object of the present invention is to provide clearance between the cleat on a cyclist's shoe and the surfaces of the pedal that are designed to mate with the cleat, wherein the clearance is easily adjustable by the cyclist to control the amount of floating of the cleat relative to the pedal.

Still another object of the present invention is to provide a threaded aperture extending from a first surface of either a cyclist's shoe cleat or a cycle pedal, where an opposite surface is normally spaced from the first surface so that a threaded shaft received in the threaded aperture adjusts the effective distance between the first surface and the opposite surface to control the amount of floating movement of the shoe cleat relative to the pedal.

A further object of the present invention is to provide opposed front and rear pockets in a bicycle pedal for receiving opposed front and rear projections that extend from a shoe cleat, wherein there is a normally loose torsional fit of the rear projection within the rear pocket such that the shoe cleat floats relative to the rear pocket, and wherein a threaded shaft extends through the pedal into at least the rear pocket to adjust the fit of the cleat in that pocket for controlling the floating according to the wishes of the cyclist.

A still further object of the present invention is to provide adjustable floating between a step-in, twist-out type of pedal provided with a hinged, spring-biased, rear claw retainer, where the adjustable floating is achieved by extending a shaft through the claw retainer and designing the shaft for adjustable positioning to selectably determine the amount that the shaft extends from the claw retainer toward a cleat removably retained by the claw retainer.

With these and other objects in mind, the present invention contemplates a cycle pedal system including a pedal body having first bearing surfaces concentric with a vertical axis. A shoe cleat is provided having second bearing surfaces concentric with the vertical axis. The first and second bearing surfaces are complementary to permit relative rotary movement therebetween around the vertical axis. The pedal body is also provided with a first limit surface offset from the first bearing surfaces. The shoe cleat is provided with a second limit surface offset from the second bearing surfaces and normally separated from the first limit surface by a first space to permit the relative rotary movement of the pedal body and the shoe cleat to be free over a relatively large arc. Facilities are received in either the pedal body or the shoe cleat and intersecting the respective first or second limit surface for reducing the effective amount of the first space to limit the relatively large arc of relative rotary movement to a selectable smaller arc of relative rotary movement. The cyclist can adjust the facilities and thus personally select the smaller arc of floating. The personal selection may, for example, take into consideration the amount of twisting of the cyclist's leg during pedalling, so as to avoid or minimize torsional stress on the cyclist's knee.

A first embodiment of the present invention includes a shoe cleat designed to mate with a cycle pedal. The cycle pedal has a first mating surface formed around the vertical axis and having a projection thereon. The shoe cleat is provided with a cleat body having a second mating surface formed around the vertical axis for receiving the first mating surface of the cycle pedal. The second mating surface has a cavity therein for loosely receiving the projection to form at least a first space between the cavity and the projection. The second mating surface corresponds to the first mating surface to permit relative movement between the projection and the cavity around the vertical axis. The first space becomes smaller or larger according to the direction of the relative movement around the vertical axis. The shoe cleat is provided with facilities for adjusting the size of the first space to selectably limit the amount of the relative movement between the projection and the cavity around the vertical axis according to the preference of the cyclist.

A second embodiment of the present invention is illustrated by a pedal system including a pedal body having a pedal axis. The pedal body and the pedal axis define a pedal platform. A front section on one side of the pedal axis and a rear section on an opposite side of the pedal axis are provided. The front section has an upwardly extending front lip adjacent a floating axis extending perpendicular to the pedal platform. The rear section has first and second bearing surfaces spaced equally from the front lip and spaced from one another. A rear lip is pivotally mounted to the rear section and positioned between the first and second bearings. The rear lip has a central release surface, a first limit surface adjacent a first end of the release surface, and a second limit surface adjacent a second end of the release surface. A shoe cleat is designed to move relative to the pedal platform around the floating axis. The shoe cleat has a rear section and a front section, with the front section provided with a projection engageable with the front lip to retain the front section of the shoe cleat on the pedal while permitting the rear section of the shoe cleat to rotate around the floating axis. The shoe cleat is provided with third and fourth bearing surfaces spaced equally from the front projection and spaced from one another corresponding to the spacing of the first and second bearings. When the projection engages the front lip the third and fourth bearing surfaces ride on the respective first and second bearings surfaces to guide the rotation of the shoe cleat relative to the pedal platform around the floating axis. The shoe cleat has a third limit surface opposed to the first limit surface and a fourth limit surface opposed to the second limit surface. The opposed first and third limit surfaces and the opposed second and fourth limit surfaces are normally separated to respectively form a first space adjacent the first end of the central release surface and a second space adjacent the second end of the central release surface to permit the rotation of the shoe cleat relative to the pedal platform around the floating axis. An adjustment mechanism is extendable into the first and second spaces to limit the rotation of the shoe cleat relative to the pedal platform around the floating axis.

BRIEF DESCRIPTION OF THE DRAWINGS

Other objects, features and advantages of the present invention will be apparent from an examination of the following detailed descriptions, which include the attached drawings in which.

PRIOR ART STEP-IN, TWIST-OUT CLEATS AND PEDALS

Figure 1:
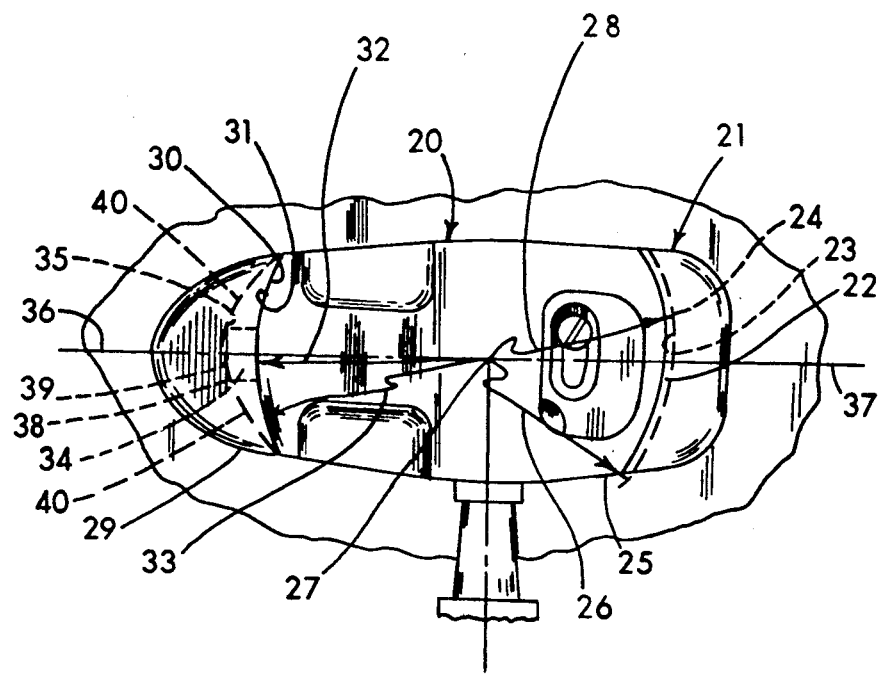
FIGS. 1 and 2 respectively depict the prior art SAMPSON and LOOK step-in, twist-out pedals and cleats.

Referring to FIG. 1, a SAMPSON step-in, twist-out pedal 20 of the type shown in U.S. Pat. No. 4,815,333 is shown matingly engaged with a cleat 21 provided on a cyclist's shoe (not shown). A front section 22 of the cleat 21 extends downwardly from the shoe and is provided with a first arcuate front bearing surface 23 that cooperates with a second arcuate front bearing surface 24 of a front portion 25 of the pedal 20. The radius 26 of the first bearing surface 23 measured relative to a vertical axis 27 of rotation equals a radius 28 of the second bearing surface 24 measured relative to the vertical axis 27 to permit rotation of the cleat 21 and thus the cyclist's shoe, around the vertical axis 27.

A rear section 29 of the cleat 21 extends downwardly from the shoe and is provided with a first arcuate rear bearing surface 30 that cooperates with a second arcuate rear bearing surface 31 of the pedal 20. Radii 32 and 33 of the respective first rear surface 30 and the second rear surface 31 are equal and measured relative to the vertical axis 27 to permit the rotation of the cleat 21, and thus the shoe, around the vertical axis 27 relative to the pedal 20.

The twist-out feature is provided by a detent 34 that extends rearwardly of the pedal 20 into tight, close-fitting engagement with a cavity 35. In the position of the cleat 21 and the pedal 20 shown in FIG. 1, a longitudinal axis 36 of the cleat 21 coincides with a longitudinal axis 37 of the pedal 20 and both axes 36 and 37 intersect the vertical axis 27. The cavity 35 is provided with a central surface 38 that mates with a distal end 39 of the detent 34 when the axes 36 and 37 coincide. As shown in FIG. 1, the central surface 38 extends to a side surface 40 on each side of the central surface 38. Each side surface 40 extends toward the first arcuate rear bearing surface 30 as the central surface 38 extends away from the axis 36. Any tendency of the shoe to rotate on the vertical axis 27 causes the distal end 39 of the detent 34 to immediately engage one or the other of the side surfaces 40, which immediately resists further rotation around the vertical axis 27 because the detent 34 is resiliently biased into the cavity 35. As a result, the normal twisting force transmitted through the cyclist's knee to the cyclist's foot is immediately resisted by the distal end 39 of the detent 34 immediately bearing on either of the side surfaces 40.

Figure 2:
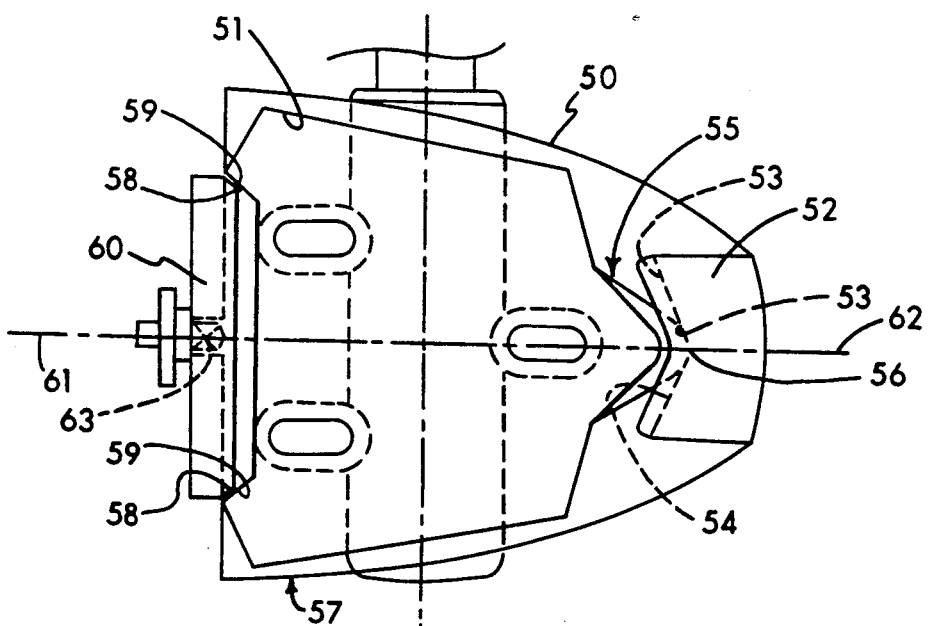

Referring to FIG. 2, a LOOK step-in, twist-out pedal 50 of the type shown in U.S. Pat. No. 4,686,867 is shown including a cleat 51 designed to be mounted on the cyclist's shoe (not shown). The pedal 50 is provided with a fixed front claw 52 having a cup 53 for receiving a rounded nose 54 on the front 55 of the cleat 51. The cup 53 allows the nose 54 to rotate around a vertical axis 56. At the rear 57 of the pedal 50, such rotation is resisted by spaced vertical side walls 58 of the cleat 51 that tightly engage central vertical walls 59 of a movable claw 60. When a longitudinal axis 61 of the cleat 51 coincides with a longitudinal axis 62 of the pedal 50, the cleat 50 is held in the position shown in FIG. 2 by the force of a spring 63 that resiliently urges the central walls 59 of the movable claw 60 against the side walls 58 of the cleat 51. When the cyclist's shoe (not shown) is urged to rotate around the vertical axis 56 from that position in FIG. 2, one of the side walls 58 immediately urges one of the central walls 59 rearwardly against the force of the spring 63 to move the movable claw 60 rearwardly. As a result, the normal twisting force transmitted through the cyclist's knee to the cyclist's foot is immediately resisted by the side wall 58 acting on the central wall 59.

In the case of both of the respective pedals 20 and 50 and the cleats 21 and 51 shown in FIGS. 1 and 2, the immediate resistance to the knee's twisting force tends to stress the cyclist's knee.

DETAILED DESCRIPTION OF PRESENT INVENTION

General Descriptions: Cleat 71 and Pedal 70 of the Present Invention

First Embodiment

Figure 3A:
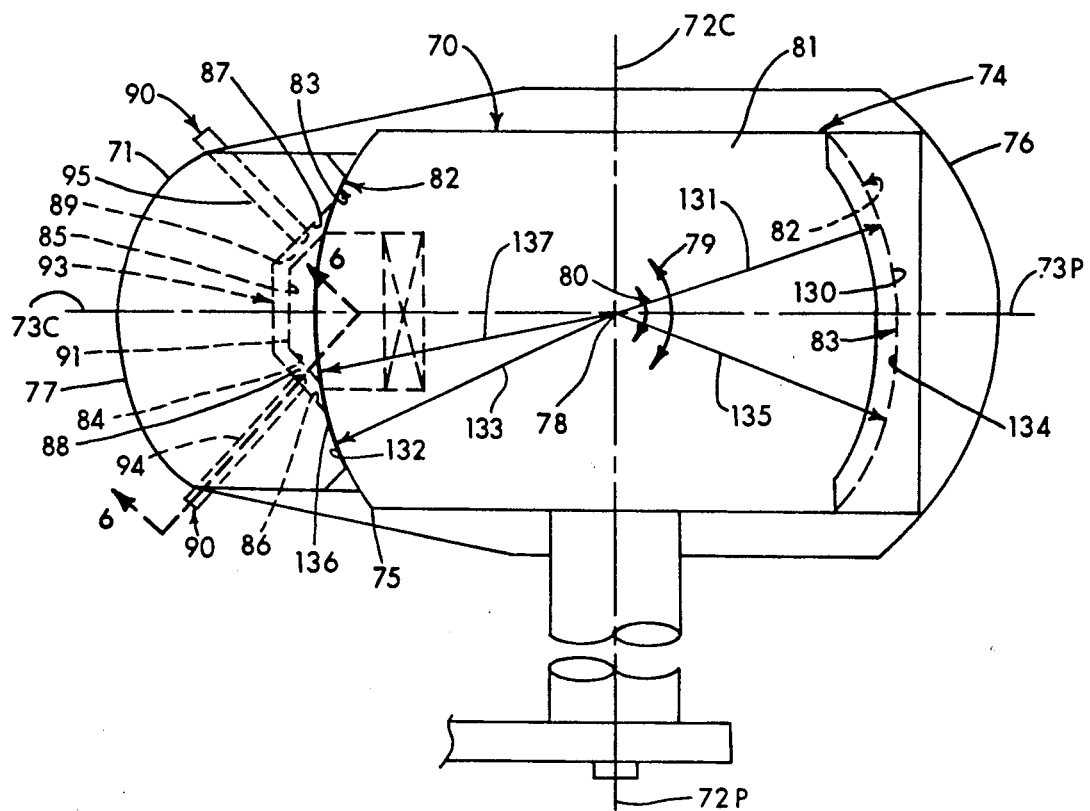
FIG. 3A is a bottom view of a first embodiment of the present invention showing spaces that permit free floating movement of a cleat relative to a pedal.
Figure 3B:
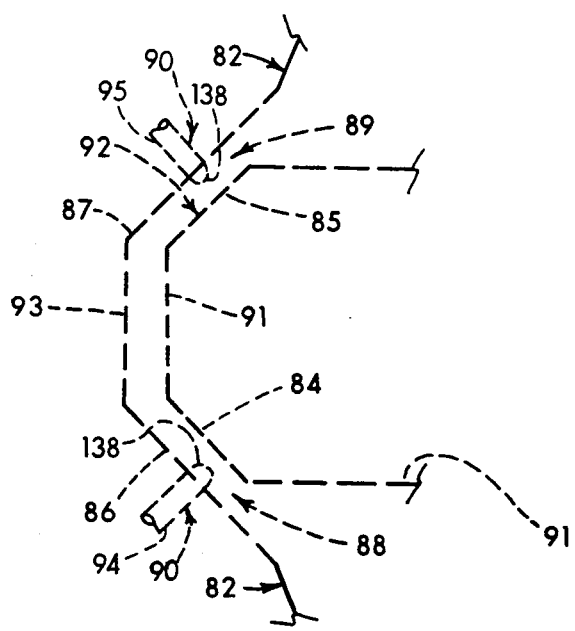
FIG. 3B is an enlargement of a portion of FIG. 3A showing the spaces formed between limit surfaces of the cleat and the pedal.

Referring now to FIGS. 3A and 3B, the present invention is generally illustrated by a first embodiment including a pedal 70 and a cleat 71 of the present invention. A transverse or pedal axis 72C of the cleat 71 and a corresponding axis 72P of the pedal 70 are perpendicular to a longitudinal axis 73C of the cleat 71 and a corresponding axis 73P of the pedal 70 which extends from a front 74 to a rear or heel portion 75 of the pedal 70 and a front 76 to a rear 77 of the cleat 71. The axes 72C, 72P, 73C and 73P are shown intersecting at a point at which a vertical or floating axis 78 is located. The cleat 71 and the pedal 70 are flat and designed to permit free rotary motion or rotation (see arrow or arc 79, which is enlarged for purposes of illustration) of the cleat 71 relative to the pedal 70 around the vertical axis 78 to an extent selectable by the cyclist to avoid an immediate resisting of the normal twisting force transmitted through the cyclist's knee to the cyclist's foot. This free, unresisted rotation 79 around the vertical axis 78 is referred to as "floating" or "floating rotation." In the present invention, the amount of the floating rotation 79 may be selected by the cyclist. The selected amount will be equal to or less than the amount of the free floating rotation 79 and is referred to as the selected rotation 80 (see arrow or arc 80, which is enlarged for purposes of illustration).

Still referring to FIGS. 3A and 3B, the pedal 70 is provided with a pedal body 81 having first bearing surfaces 82 concentric with the vertical axis 78. The cleat 71 has second bearing surfaces 83 concentric with the vertical axis 78. The first and second bearing surfaces 82 and 83 are complementary to permit relative rotary movement between the cleat 71 and the pedal 70 around the vertical axis 78. The second bearing surfaces 83 form front and rear pockets for receiving the first bearing surfaces 82 of the pedal 70.

The pedal 70 is provided with opposed first and second limit surfaces 84 and 85, respectively, that are offset from the first bearing surface 82 at the rear 75 of the pedal 70. The cleat 71 is provided with third and fourth limit surfaces 86 and 87 respectively offset from the second bearing surface 83 at the rear 77 of the cleat 71. The third and fourth limit surfaces 86 and 87, respectively, are normally parallel and normally separated from the respective first and second limit surfaces 84 and 85 by respective first and second spaces 88 and 89 to permit the relative rotary movement 79 of the pedal body 81 and the cleat 71 to be free for a relatively large arc (see arrow 79).

Either the pedal 70 or the cleat 71 is provided with a floating adjuster 90 that intersects the respective first or second limit surfaces 84 or 85, or the third or fourth limit surfaces 86 or 87, respectively. In FIGS. 3A and 3B, the floating adjusters 90 are shown intersecting the respective third and fourth bearing surfaces 86 and 87 for reducing the effective amount of the respective first and second spaces 88 and 89 to limit the relatively large arc 79 of relative rotary movement to the selectable smaller arc of the selected relative rotary movement 80 (see arrow 80).

The first embodiment of the present invention includes a detent 91 movable through the first bearing surface 82 at the rear 75 of the pedal 70. The detent 91 has the first limit surface 84 and the second limit surface 85 thereon on an opposite side 92 thereof from the first limit surface 84. The third and fourth limit surfaces 86 and 87 are defined by a cavity 93 in the cleat 71 for receiving the detent 91. The third limit surface 86 is opposed to and separated from the first limit surface 84 by the first space 88. The cavity 93 also defines the fourth limit surface 87 opposed to and separated from the second limit surface 85 by the second space 89. The opposed first and third limit surfaces 84 and 86, respectively, and the opposed second and fourth limit surfaces 85 and 87, respectively, are effective to define the limits of respective clockwise and counterclockwise directions of the relatively large arc of relative rotary movement 79 around the vertical axis 78.

The floating adjuster 90 is provided in the cleat 71 and includes a first threaded rod 94 extending through the cleat 71 into the first space 88 and a second threaded rod 95 extending through the cleat 71 into the second space 89. Each of the first and second threaded rods 94 and 95 is movable, such as by being rotatable, to extend a variable distance into the respective first and second spaces 88 and 89 to limit the respective clockwise and counterclockwise direction of relative rotary movement 79 of the cleat 71 to one selectable smaller arc of selected rotation 80 in each of the respective clockwise and counterclockwise directions. The rods 94 and 95 of the floating adjuster 90 can be adjusted by the cyclist so that the amount of floating is related to the amount of twisting that the cyclist's knee normally imposes on the cyclist's foot, and thus on the cleat 71.

Cleat 101 and Pedal 100 of the Present Invention

Second Embodiment

Figure 4:
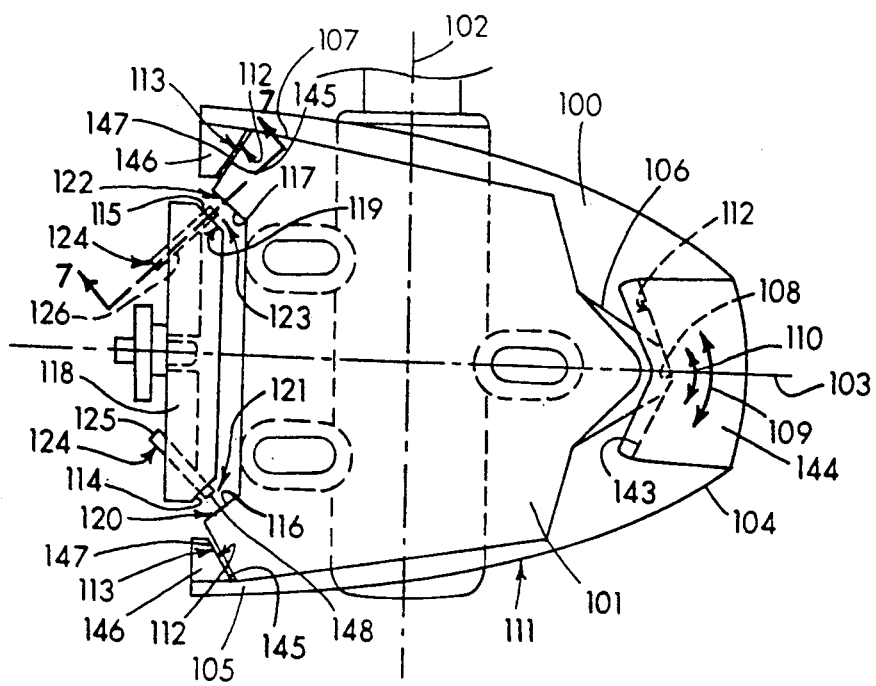
FIG. 4 is a top view of a second embodiment of the present invention wherein a floating adjuster is provided on a rear claw.

In a second embodiment of the present invention shown in FIG. 4, a pedal 100 and a cleat 101 cooperate and are described with respect to a transverse or pedal axis 102 and a longitudinal axis 103. The pedal 100 has a front 104 and a rear 105, and a corresponding front 106 and a rear 107 are provided on the cleat 101. A vertical or floating axis 108 is at the front 106 of the cleat 101 so that free rotation (shown by arrow 109, which is enlarged for purposes of illustration) of the cleat 101 relative to the pedal 101 is permitted. Selectable rotation 110 (see arrow 110, which is enlarged for purposes of illustration) is also shown around the vertical axis 108.

The pedal 100 is provided with a pedal body 111 having first bearing surfaces 112 that cooperate with second bearing surfaces 113 of the cleat 101 to guide the pedal 100 and the cleat 101 in the free rotation 109 around the vertical axis 108. Opposed first limit surfaces 114 and 115 on the pedal 100 cooperate with respective opposed second limit surfaces 116 and 117 on the cleat 101 to effectively define the amount of the free rotation 109. With each axis 102 and 103 of the pedal 100 and the cleat 101 aligned, the opposed first and second limit surfaces 114 and 116, and 115 and 117, respectively, are parallel. The first limit surface 114 is provided on a claw 118 pivotally mounted to the pedal body 111. The claw 118 has the first limit surface 115 thereon on an opposite side 119 thereof from the first limit surface 114. The second limit surface 116 is formed by a first inclined inner wall 120 of the cleat 101. The first inner wall 120 is opposed to and separated from the first limit surface 114 by a first space 121. The cleat 101 is also provided with a second inclined inner wall 122 that is opposed to and separated from the first limit surface 115 by a second space 123. The opposed first wall 120 and the first limit surface 114, and the opposed second wall 122 and the first limit surface 115 are effective to define the limits of respective clockwise and counterclockwise directions of the relatively large arc of the relative rotary movement 109 of the cleat 101.

A floating adjuster 124 is provided in the claw 118 and includes a first threaded rod 125 extending through the claw 118 into the first space 121 and a second threaded rod 126 extending through the claw 118 into the second space 123. Each of the first and second threaded rods 125 and 126 is movable, such as by being rotatable, to extend a variable distance into the respective first and second spaces 121 and 123 to limit the respective clockwise and counterclockwise direction of free relative rotary movement 109 to the selectable smaller arc in each of the respective clockwise and counterclockwise directions, so that the amount of the selectable rotary movement 110 of the cleat 101 may be selected.

Pedal 100 and Cleat 101 With Floating Adjuster 127

Third Embodiment

Figure 5:
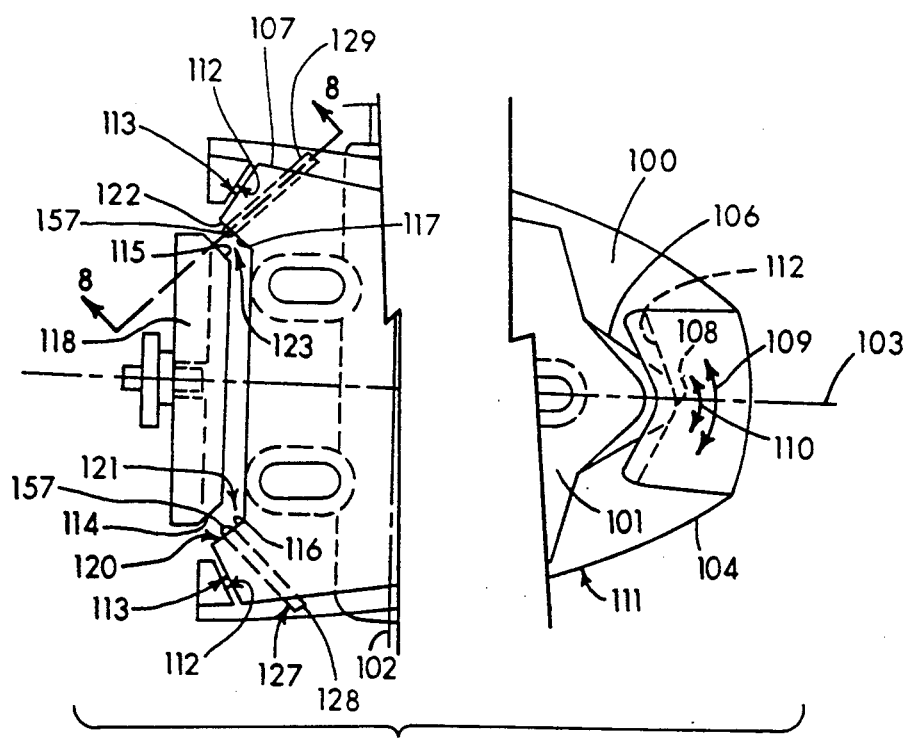
FIG. 5 is a top view of a third embodiment of the present invention showing a floating adjuster provided on a cleat.

Referring to FIG. 5, in a third embodiment of the present invention that is similar to the second embodiment, a floating adjuster 127 is provided in the cleat 101 and includes a first threaded rod 128 extending through the cleat 101 into the first space 121 and a second threaded rod 129 extending through the cleat 101 into the second space 123. In a manner similar to that of the rods 125 and 126, each of the respective first and second threaded rods 128 and 129 is rotatable to extend a variable distance into the respective first and second spaces 121 and 123 to limit the respective clockwise and counterclockwise direction of relative rotary movement 109 of the cleat 101 to the selectable smaller arc in each of the respective clockwise and counterclockwise directions, so that the amount of the selectable rotary movement 110 of the cleat 101 may be selected.

Pedal 70 and Cleat 71

Detailed Description of First Embodiment

Referring again to FIGS. 3A and 3B, the cleat 71 is adapted to be fixed to the shoe (not shown) of the cyclist. The first bearing surfaces 82 of the pedal 70 are shown on opposite sides of the vertical axis 78, with the bearing surface 82 at the front 74 being designated 130 and being at a radius 131 from the vertical axis 78, whereas the bearing surface 82 at the rear 75 is designated 132 and is at a radius 133 from the axis 78. The second bearing surfaces 83 of the cleat 71 include a front bearing surface 134 at a radius 135 from the axis 78, and a rear bearing surface 136 at a radius 137 from the vertical axis 78. The bearing surfaces 130, 132, 134 and 136 are thus journal bearings and the radii 131, 133, 135 and 137 are equal so that the cleat 71 rotates freely around the vertical axis 78.

The step-in feature of the pedal 70 and the cleat 71 is as shown in U.S. Pat. No. 4,815,333, which is incorporated herein by reference. However, as shown in FIGS. 3A and 3B, 6 and 9, the detent 91 is provided with the opposed limit surfaces 84 and 85 that are spaced by the respective spaces 88 and 89 from the respective limit surfaces 86 and 87 on the cleat 71. The opposed limit surfaces 84, 85, 86 and 87 extend vertically. The limit surfaces 84 and 85 are effectively bevelled surfaces on the detent 91.

Figure 6:
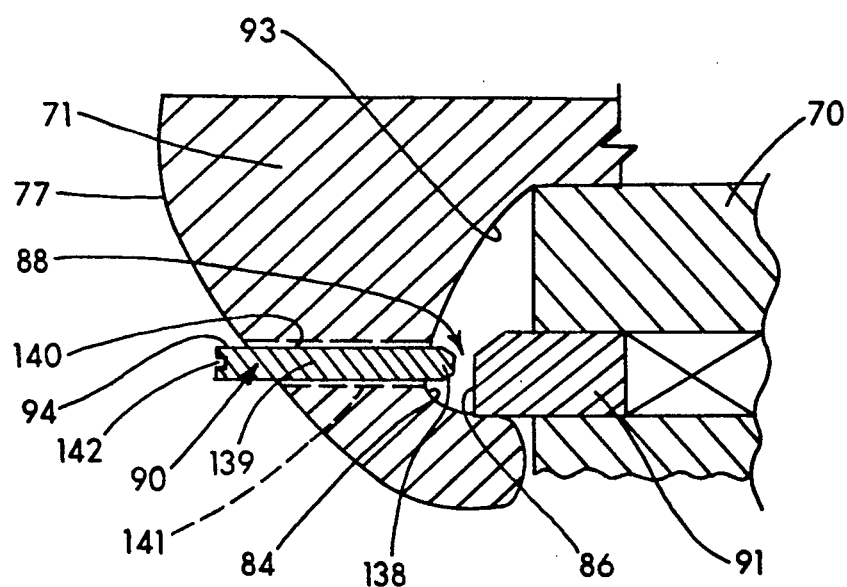
FIG. 6 is a cross-sectional view taken along line 6—6 in FIG. 3A showing a floating adjuster in the form of a threaded rod that extends through the cleat of the first embodiment to engage a limit surface on a detent to selectably limit the floating movement.

As shown in FIG. 6, the first rod 94 of the floating adjuster 90 has a distal end 138 that extends into the space 88 by a selectable amount. This amount is selected by providing external threads 139 on the first rod 94 that cooperate with a tapped hole 140 having threads 141. The tapped hole 140 is perpendicular to the third limit surface 86. The first rod 94 may have an ALLEN socket 142 that cooperates with an ALLEN tool (not shown) for rotating the first rod 94. As an alternative to the ALLEN socket 142, the rods 94 and 95 may be provided with a slot (not shown) for use with a flat blade of a screw driver (not shown), or the outside of the rods 94 and 95 may be knurled, for example. The second rod 95 is provided in the same manner in the opposite side of the rear 77 of the cleat 71 (see FIGS. 3A, 3B and 9). When both of the rods 94 and 95 are withdrawn from the holes 140, the effective distance between the first limit surface 84 and the second limit surface 86 is the width of the entire space 88, and the effective distance between the second limit surface 85 and the fourth limit surface 84 is the width of the entire space 89. This allows the free rotation 79 (FIG. 3A) of the cleat 71 to be a maximum, to provide maximum floating of the cleat 71 relative to the pedal 70.

Figure 9:
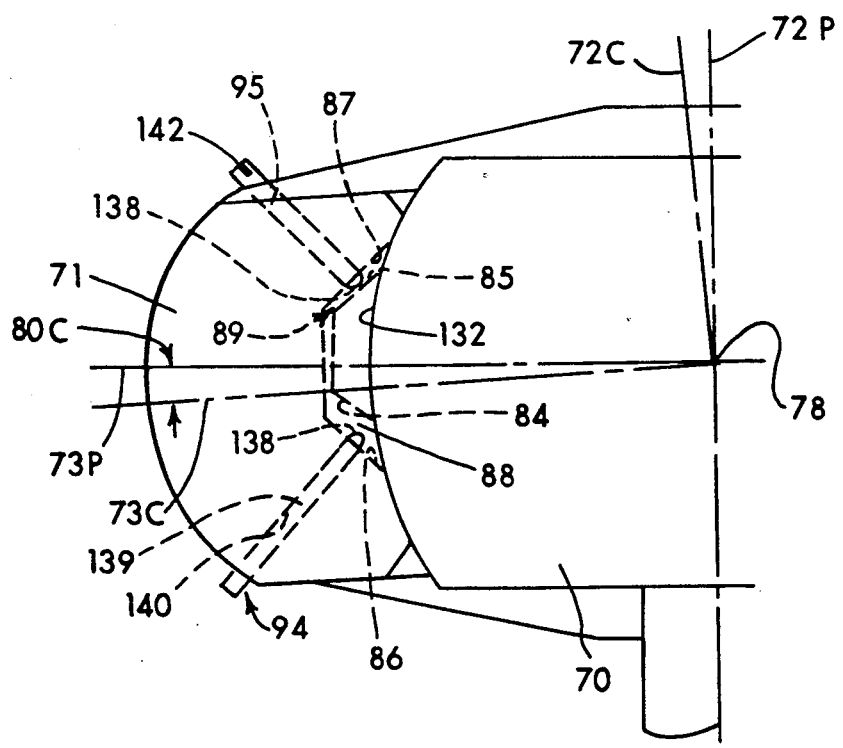
FIG. 9 is an enlarged top view of a portion of FIG. 3 showing the cleat rotated through a selectable amount of rotation around a vertical axis until one of the threaded rods touches the limit surface on the detent.

To accommodate various cyclist's preferences, the cyclist may rotate one or both of the rods 94 and 95 to cause one or both of the distal ends 138 to enter the spaces 88 and 89, respectively. The distal ends 138 are effective to selectively reduce the effective widths of the respective spaces 88 or 89, since the distal end 138 in the space 89, for example, will decrease the amount of the free counterclockwise travel 79 of the fourth limit surface 87 toward the second limit surface 85 before the fourth surface 87 hits the second limit surface 85. In particular, in FIG. 9 counterclockwise travel of the cleat 71, and thus the fourth limit surface 87, is shown limited by the second rod 95 when the distal end 138 of the second rod 95 engages the second limit surface 85. In FIG. 9, the selected rotation 80 is designated 80C to indicate the amount of counterclockwise selected rotation from a neutral rotary position defined by the stationary longitudinal axis 73P of the pedal 70. It may be understood then, that according to the extent of the twisting of the knee of the cyclist as the cyclist pedals, the rods 94 and 95 may be selectably rotated to extend either one or both of the distal ends 138 into or out of the respective spaces 88 and 89 to thus select the effective dimensions of the respective spaces 88 and 89. The distal ends 138 that extend into the spaces 88 and 89 may be described as limit sections of the rods 94 and 95.

With the effective dimensions of the spaces 88 and 89 selected by the cyclist, the cleat 71 is free to rotate around the vertical axis 78 by the selectable amount 80C (FIG. 9) of the floating rotation 79 (FIG. 3A) before one of the rods 94 or 95 engages one of the respective first or second limit surfaces 84 or 85. If the rod 94 has been retracted so that the distal end 138 is flush with the third limit surface 86, for example, then upon clockwise rotation of the cleat 71 the first limit surface 84 will be engaged by the third limit surface 86 to stop the free, selected rotation 80, which in this event will be the full extent of the floating rotation 79.

Still referring to FIG. 9, it may be understood that the limit surfaces 86 and 87 effectively decrease the depth of the cavity 93 from the axis 73P outwardly in the direction of the axis 72P. With this shape of the cavity 93, after the threaded rod 95 engages the second limit surface 85, further counterclockwise rotation of the cleat 71 will cause the threaded rod 95 to force the detent 91 into the pedal 70 until the threaded rod 95 moves past the second limit surface 85. At this time, the opposed second and fourth limit surfaces 85 and 87, respectively, will engage. The fourth limit surface 87 will continue to force the detent 91 into the pedal 70 until the distal end of the detent 91 is flush with the rear bearing surface 132 of the pedal 70. The twist-out operation continues until the cleat 71 is disengaged from the pedal 70. To provide smooth motion of the rods 94 and 95 on the limit surface 84 and 85, respectively, the distal ends 138 are rounded into a semi-spherical shape.

Cleat 101 and Pedal 100

Detailed Description of Second Embodiment

Figure 7:
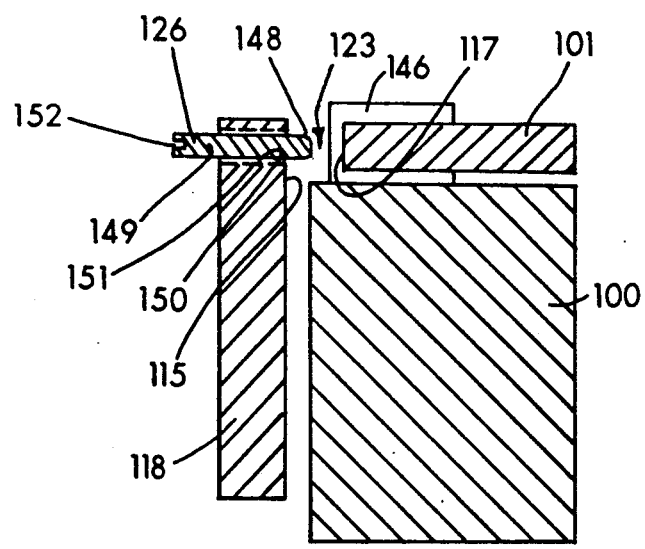
FIG. 7 is a cross-sectional view taken along line 7—7 in FIG. 4 showing the floating adjuster as a threaded rod extending through the rear claw into a space between limit surfaces on the rear claw and on a cleat.

Referring to FIGS. 4 and 7, the second embodiment is shown. The first bearing surfaces 112 include a front bearing surface 143 on a fixed claw 144 that extends upwardly from the pedal 100. At the rear 105 of the pedal 100, the first bearing surfaces 112 are in the form of rear bearing surfaces 145 provided on tabs 146 that extend upwardly from the rear 105 of the pedal 100. The bearing surfaces 143 and 145 hold the cleat 101 against rearward movement relative to the pedal 100. The cleat 101 is free to rotate on the vertical axis 108 under the guidance of rear bearing surfaces 147 that are part of the second bearing surfaces 113 of the cleat 101, and that cooperate with the bearing surfaces 145. The bearing surfaces 145 and 147 are journal bearings and are at equal radii from the vertical axis 108.

The step-in, twist-out feature of the pedal 100 and the cleat 101 is as shown in U.S. Pat. No. 4,686,867, the disclosure of which is incorporated herein by reference. However, as shown in FIGS. 4 and 7, the rear pivotable claw 118 is provided with the first limit surfaces 114 and 115 that are spaced by the spaces 121 and 123, respectively, from the respective second limit surfaces 116 and 117. As shown in FIG. 7, the second rod 126 has a rounded distal end 148 that extends into the second space 123 by a selectable amount. This amount is selected in the same manner as is done with the rods 94 and 95 (FIG. 3) by providing external threads 149 (FIG. 7) on the second rod 126 that cooperate with a tapped hole 150 having threads 151. The second rod 126 may have an ALLEN socket 152 that cooperates with an ALLEN tool (not shown) for rotating the second rod 126. The first rod 125 is provided in the same manner in the opposite side of the rear claw 118 of the pedal 100. As with the rods 94 and 95, the rods 125 and 126 may be provided with slots (not shown), knurled outer surfaces (not shown) or other suitable structure for being engaged and rotated.

When both of the rods 125 and 126 are withdrawn from the holes 150, the effective distance between the first limit surface 114 and the second limit surface 116, and between the first limit surface 115 and the second limit surface 117, is the entire respective space 121 or 123. This allows the free rotation 109 of the cleat 101 to be a maximum, to provide maximum floating of the cleat 101 relative to the pedal 100. To accommodate various cyclist's preferences, the cyclist may rotate one or both of the rods 125 and 126 to cause one or both of the distal ends 148 to enter the spaces 121 and 123, respectively. The distal ends 148 in the spaces 121 or 123 may thus be described as limit sections of the rods 125 and 126 and are effective to selectively reduce the effective width of the respective space 121 or 123, since the distal end 148 in the space 121, for example, will decrease the amount of the free clockwise travel of the second limit surface 116 toward the first limit surface 114 before the second limit surface 116 hits the distal end 148 (FIG. 7) of the rod 125.

Detailed Description of the Third Embodiment

Figure 8:
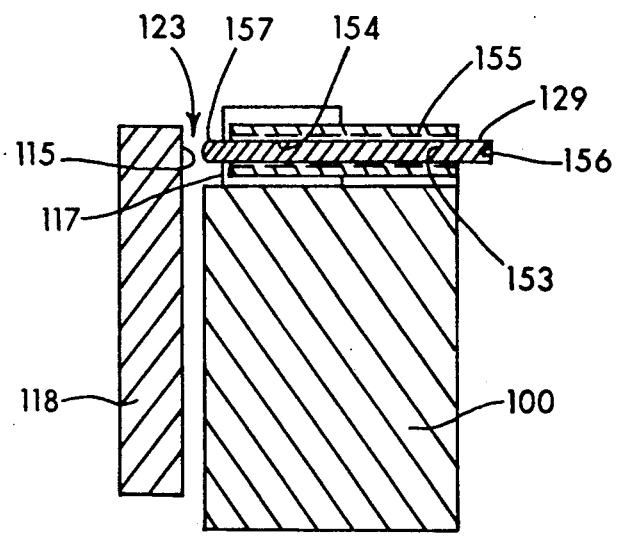
FIG. 8 is a cross-sectional view taken along line 8—8 in FIG. 5 showing the floating adjuster as a threaded rod extending through the cleat into a space between limit surfaces on the rear claw and the cleat.
Figure 10:
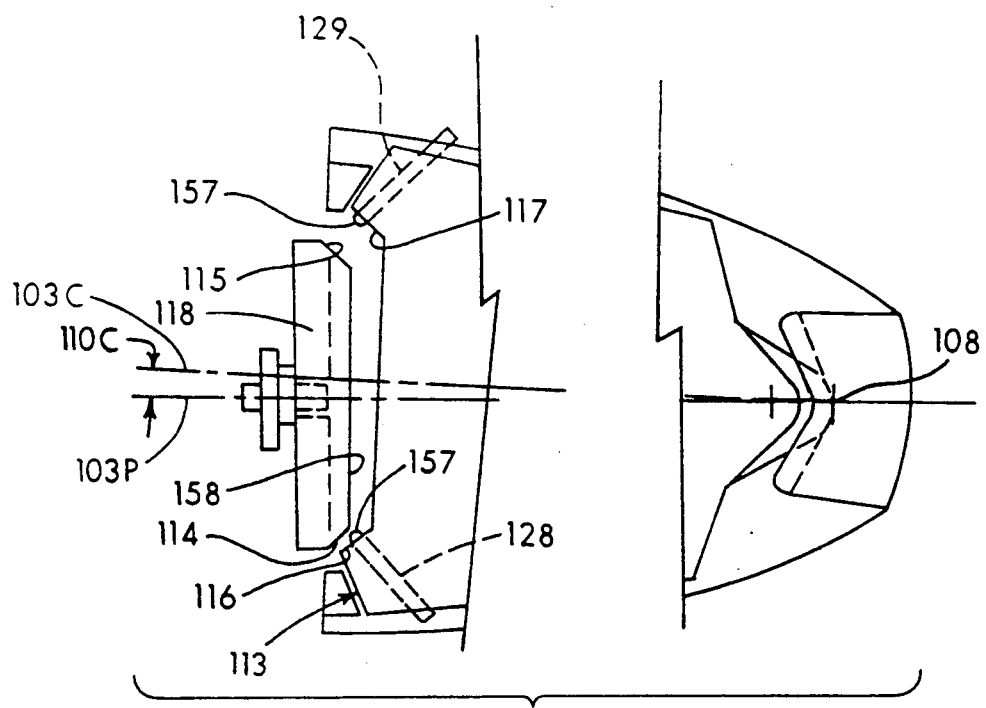
FIG. 10 is an enlarged top view of a portion of FIG. 5 showing the cleat rotated through a selected amount of rotation around a vertical axis until one of the threaded rods in the cleat hits the limit surface on the rear claw to stop the free floating rotation.

Referring to FIGS. 5, 8 and 10, the third embodiment is shown having the step-in feature of U.S. Pat. No. 4,686,867. The bearing surfaces 112 and 113 are provided as in FIG. 4. However, the cleat 101 is provided with the floating adjuster 127 in the form of the first rod 128 and the second rod 129. The amount that the rods 128 and 129 extend into the respective spaces 121 and 123 is selectable by providing external threads 153 (FIG. 8) on the rods 121 and 123. The threads 153 cooperate with a tapped hole 154 having threads 155. The rods 128 and 129 have ALLEN sockets 156 that may be used with an ALLEN tool (not shown). Alternatively, the structure described above may be provided for rotating the rods 128 and 129. In a manner similar to that described with respect to FIGS. 4 and 7, the rods 128 and 129 may be fully withdrawn from the respective spaces 121 and 123 to permit maximum free rotation 109. By suitably rotating the rods 128 and 129, rounded distal ends 157 (FIGS. 8 and 10) of the rods 128 and 129 enter the spaces 121 and 122. The distal ends 157 are effective to selectively reduce the widths of the respective space 121 or 123, since the distal end 157 in the space 121, for example, will decrease the amount of the free clockwise travel of the cleat 101 before the distal end 157 of the first rod 128 hits the first limit surface 114.

In FIG. 10, clockwise rotation of the cleat 101 is shown limited by the first rod 128 when it engages the first limit surface 114. The selected rotation 110 is there designated 110C to indicate the amount of clockwise selected rotation from a neutral rotary position defined by the stationary longitudinal axis 103 of the pedal 100, which is designated 103P to distinguish from the clockwise rotated longitudinal axis 103C of the cleat 101. It may be understood then, that according to the extent of the twisting of the knee of the cyclist as the cyclist pedals, the rods 125, 126, 128 and 129 may be selectably rotated to extend either one or both of the respective distal ends 148 or 157 into or out of the respective spaces 88, 89, 121 or 123 to thus select the effective dimensions of the respective spaces 88, 89, 121 or 123. As selected by the cyclist, the cleat 101 is free to rotate around the vertical axis 108 by the amount of the selected rotation 110 before one of the rods 125, 126, 128 or 129 engages one of the respective limit surfaces.

If the rods 125, 126, 128 or 129 have been retracted so that the distal ends 148 or 157 are flush with the respective limit surfaces 114, 115, 116, or 117, for example, then upon clockwise rotation of the cleat 101 the second limit surface 116 will engage the first limit surface 114 to stop the free, selected rotation 109. This allows the free rotation 109 of the cleat 101 to be a maximum, to provide maximum floating of the cleat 101 relative to the pedal 100. To accommodate various cyclist's preferences, the cyclist may rotate one or both of the rods 125 and 126, or 128 and 129, to cause one or both of the respective distal ends 148 or 157 to enter the spaces 121 or 123, respectively. The distal ends 148 and 157 are effective to selectively reduce the width of the respective spaces 121 and 123, since the distal end 157 in the space 121, for example, will decrease the amount of the free clockwise travel of the second limit surface 116 of the cleat 101 toward the first limit surface 114 before the distal end 157 hits the first limit surface 114.

Referring to FIG. 10, it may be understood that after the distal end 157 of the threaded rod 128 has engaged the first limit surface 114, further clockwise rotation of the cleat 101 will cause the threaded rod 128 to force the claw 118 rearwardly until the threaded rod 128 moves past the limit surface 114 of the claw 118. At this time, the opposed second limit surface 116 and then the rear bearing surface 113 will engage a central release surface 158 of the claw 118 and the second limit surface 116 and the rear bearing surface 113 will continue to force the claw 118 rearwardly until the cleat 101 is disengaged from the pedal 100.

While the preferred embodiments have been described in order to illustrate the fundamental relationships of the present invention, it should be understood that numerous variations and modifications may be made to these embodiments without departing from the teachings and concepts of the present invention. Accordingly, it should be clearly understood that the form of the present invention described above and shown in the accompanying drawings is illustrative only and is not intended to limit the scope of the invention to less than that described in the following claims.

What is claimed is:

1. A cycle pedal system comprising:
 a pedal body having means defining first bearing surfaces concentric with a vertical axis,
 a shoe cleat having means defining second bearing surfaces concentric with said vertical axis,
 said first and second bearing surfaces being complementary to permit relative rotary movement therebetween around said vertical axis,
 said pedal body being provided with means for defining a first limit surface offset from said first bearing surfaces,
 said shoe cleat being provided with means for defining a second limit surface offset from said second bearing surfaces and normally separated from said first limit surface by a first space to permit said relative rotary movement of said pedal body and said shoe cleat to be free for a relatively large arc of said relative rotary movement, and
 means received in said shoe cleat and intersecting said respective first or second limit surface for reducing the effective amount of said first space to limit said relatively large arc of relative rotary movement to a selectable smaller arc of relative rotary movement.

2. A cycle pedal system according to claim 1, further comprising:

said means for defining said first limit surface includes a detent movable through said first bearing surfaces and having said first limit surface thereon, said detent having a third limit surface thereon on an opposite side thereof from said first limit surface, and said means for defining said second limit surface includes a cavity in said shoe cleat for receiving said detent and having said second limit surface opposed to and separated from said first limit surface by said first space, said cavity also having a fourth limit surface opposed to and separated from said third limit surface by a second space, said opposed first and second limit surfaces, and said opposed third and fourth limit surfaces, being effective to define the limits of respective clockwise and counterclockwise directions of said relatively large arc of relative rotary movement.

3. A cycle pedal system according to claim 2, wherein:

said reducing means is provided in said shoe cleat and includes a first threaded rod extending through said shoe cleat into said first space and a second threaded rod extending through said shoe cleat into said second space, each of said first and second threaded rods being rotatable to extend variably into said respective first and second spaces to limit said respective clockwise and counterclockwise direction of relative rotary movement to one said selectable smaller arc in each of said respective clockwise and counterclockwise directions.

4. A cycle pedal system according to claim 1, further comprising:

said means for defining said first limit surface includes a claw pivotally mounted to said pedal body and having said first limit surface thereon, said claw having a third limit surface thereon on an opposite side thereof from said first limit surface, said means for defining said second limit surface includes a first inclined inner wall of said shoe cleat opposed to and separated from said first limit surface by said first space, said last-mentioned defining means further including a second inclined inner wall of said shoe cleat opposed to and separated from said third limit surface by a second space, said opposed first wall and first limit surface, and said opposed second wall and said third limit surface, being effective to define the limits of respective clockwise and counterclockwise directions of said relatively large arc of relative rotary movement.

5. A cycle pedal system according to claim 4, wherein:

said reducing means is provided in said shoe cleat and includes a first threaded rod extending through said shoe cleat into said first space and a second threaded rod extending through said shoe cleat into said second space, each of said first and second threaded rods being rotatable to extend variably into said respective first and second spaces to limit said respective clockwise and counterclockwise direction of relative rotary movement to one said selectable smaller arc in each of said respective clockwise and counterclockwise directions.

6. A cycle pedal system according to claim 4, wherein:

said reducing means is provided in said claw and includes a first threaded rod extending through said claw into said first space and a second threaded rod extending through said claw into said second space, each of said first and second threaded rods being rotatable to extend variably into said respective first and second spaces to limit said respective clockwise and counterclockwise direction of relative rotary movement to one said selectable smaller arc in each of said respective clockwise and counterclockwise directions.

7. A bicycle pedal system, comprising:

a shoe cleat having a flat body and front and rear arcuate surfaces concentric with a first axis that is perpendicular to said body, said front and rear surfaces forming a journal bearing concentric with said first axis, said rear surface having a pocket therein, said flat body having threaded apertures therein extending from an exterior thereof to said pocket;

a pedal body having a flat surface and forward and rearward arcuate surfaces concentric with said first axis for reception in said journal bearing to rotate around said first axis, said pedal body having a detent provided with opposite vertical sides, said detent projecting from said pedal body and designed to be loosely received in said pocket to provide first and second spaces between said opposite vertical sides of said detent and said pocket to allow free rotation of said pedal body in said journal bearing around said first axis; and a threaded rod received in each said threaded aperture, each of said rods having means thereon adjacent said exterior of said flat body of said shoe cleat for rotating said rods to advance each said rod into said respective first and second spaces a selectable distance to decrease one or both of said spaces and limit said free rotation of said pedal body in said journal bearing.

8. A bicycle pedal system comprising:

a shoe cleat adapted to be affixed to a shoe of a cyclist, a pedal body adapted to be connected to a shaft on a bicycle crank arm, said shoe cleat having a substantially flat horizontally oriented top portion, said shoe cleat also having a front portion downwardly projecting from said top portion and provided with an arcuate rear facing vertical surface, said pedal body having an arcuate forward extremity and a heel portion having an arcuate rear facing vertical surface, said cleat having an arcuate channel in said rear facing vertical surface of said front portion for matingly engaging and receiving said forward arcuate extremity of said pedal body, said shoe cleat having a downwardly projecting heel portion provided with a cavity, means including a heel portion of said pedal body engaged in said heel portion of said cleat, said means further including said arcuate forward extremity, said arcuate channel on said rear facing vertical surface of said front portion of said cleat and a spring-loaded detent element extending horizontally outward from said arcuate rear facing vertical surface of said heel portion of said pedal body for matingly engaging said shoe cleat in an interlocked manner whereby pedaling forces may be applied to said pedal body by said cleat in an upward, downward, forward and backward direction with respect to the longitudinal axis of said bicycle, means for controllably disengaging said cleat from said pedal body in response to a torsional force applied by said shoe cleat on said pedal body, said spring-loaded detent element and said cavity of said shoe cleat being spaced from each other to allow relative torsional movement therebetween before the torsional force is applied to said pedal body, and means provided on said downwardly projecting heel portion of said shoe cleat for selectably limiting the amount of the relative torsional movement before the torsional force is applied to said pedal body.

9. A bicycle pedal system according to claim 8, wherein:

said spring-loaded detent element is provided with vertically extending bevelled surfaces, said cavity of said heel portion of said shoe cleat is provided with vertically extending flat surfaces opposed to and spaced from said bevelled surfaces of said detent element, and said limiting means includes a threaded aperture extending in said heel portion of said shoe cleat into intersection with each of said flat surfaces, an externally threaded rod received in each of said threaded apertures, and means on said rods for adjusting the position of said rods in said apertures so that said rods extend into said space between said bevelled surfaces and said that surfaces for selectably engaging said bevelled surfaces.

10. In a bicycle pedal system including:

a shoe cleat adapted to be affixed to a shoe of a cyclist, a pedal body adapted to be connected to a shaft on a bicycle crank arm, said pedal body having a front extremity provided with a first longitudinal radius, said cleat having a substantially flat horizontally oriented top portion, and a downwardly projecting front portion affixed to said top portion, said front portion of said cleat having a rear facing vertical surface provided with an arcuate channel, said arcuate channel having a longitudinal radius equal to said first longitudinal radius;

said shoe cleat having a downwardly projecting rear heel portion affixed to said top portion and having an inner front facing vertical surface, said front facing vertical surface of said heel portion of said cleat having an inner arcuate channel, said inner arcuate channel having a longitudinal radius equal to said first longitudinal radius, said heel portion of said cleat having a lower front surface provided with a ridge, said inner arcuate channel of said heel portion of said cleat having an arcuate seating cavity, said cavity being deepest in the middle of said heel portion intermediate the sides of said heel portion and having a decreasing depth as each side of said heel portion is approached, said front extremity of said pedal body being adapted to be inserted into and matingly engaged with said arcuate channel in said front portion of said cleat so that said front extremity engages in said front portion of said cleat, said pedal body having an arcuate rear extremity provided with a longitudinal radius equal to said first longitudinal radius, said rear extremity of said pedal body having a rear facing vertical surface, a spring-loaded detent element normally protruding outward from said rear facing vertical surface of said rear extremity of said pedal body and movable inwardly into said pedal body, a lip on said ridge for moving said detent element inwardly after said forward extension of said pedal body is matingly engaged with said channel in said front portion of said cleat and as said lip of said ridge in said heel portion of said cleat presses downward against said detent element, said detent element being adapted to clear said ridge and extend outwardly from said rear facing vertical surface of said pedal body into said arcuate seating cavity in response to a further downward travel of said heel portion of said cleat with respect to said rear extremity of said pedal body, and said pedal body and said cleat being vertically and laterally matingly engaged upon the outward extension of said detent element as it clears said ridge and extends into said cavity, said rear facing vertical surface of said pedal body engaging in said inner arcuate channel in said heel portion of said cleat when said body and said cleat are matingly engaged, the improvement in said pedal system comprising:

said sides of said heel portion adjacent said deepest portion of said arcuate seating cavity being longitudinally spaced from said detent element in said arcuate seating cavity to allow said shoe cleat to freely rotate in the plane of said top portion of said shoe cleat and relative to said detent element, and means extending through said sides of said heel portion on each side of said deepest portion of said arcuate seating cavity for adjustably extending into said longitudinal spaces to selectably limit the amount of said free rotation of said shoe cleat relative to said pedal body.

11. In a pedal system according to claim 10, the improvement further comprising:

said detent element being provided with bevelled sides opposite said extending means, and said extending means engaging one said bevelled side to limit said free rotation, wherein further rotation of said shoe cleat beyond said free rotation causes said extending means to ride on said bevelled surface and move said detent element inwardly to start to disengage said cleat from said pedal body.

12. In a pedal system according to claim 11, the improvement further comprising:

said extending means being formed from a threaded aperture in each of said sides of said heel portion, and a threaded rod received in each said aperture, each said rod having a socket on an outer end thereof external of said cleat and a bearing surface on an inner end there of received in one of said longitudinal spaces.

13. In a pedal system included:
a solid pedal body,
a pedal axle extending perpendicular to and through said pedal body,
a shoe cleat,
a front downward extension on said cleat,
a rear facing vertical surface having an arcuate channel on said front extension of said cleat,
an arcuate forward facing vertical surface on a front extremity of said body,
means for matingly engaging said front extremity of said body with said channel of said cleat in an interlocked manner by inserting said front extremity into said channel,
an arcuate rear facing vertical surface on a rear extremity of said body,
a detent horizontally oriented perpendicular to said axle and extending outwardly from said rear facing vertical surface of said pedal body,
said detent having a downwardly projecting rear extremity of said cleat having a front facing arcuate vertical surface,
an arcuate channel in said front facing surface of said cleat,
a cavity in said last mentioned channel, and
means including said detent for matingly engaging said rear extremity of said cleat and said rear extremity of said body by pressing a lower portion of said rear extremity of said cleat against said detent, said cleat having a downwardly projecting rear extremity provided with a front facing arcuate vertical surface,
said arcuate surfaces of said cleat and said arcuate extremities of said body having horizontal equal radii which allow said cleat to be rotated horizontally to release said cleat and said body in response to a torsional force in a circular manner along the outside dimensions of said pedal body when a predetermined release force is exceeded; the improvement in said pedal system comprising:
said detent having inclined side surfaces,
said cavity in said arcuate channel of said front facing surface of said cleat having a longitudinal surface corresponding to each said inclined side surfaces, said longitudinal surfaces being normally spaced from said inclined side surfaces to permit said cleat to be rotated horizontally through a selected angle without said longitudinal surfaces touching said inclined side surfaces; and
means threadedly engaging said cleat adjacent said longitudinal surfaces for limiting said selected angle of horizontal rotation.

14. In a pedal system according to claim 13, wherein:
said limiting means includes a rod having a bearing surface movable between each said spaced longitudinal surface and each said inclined side surface to selectably limit said horizontal rotation.

15. In a shoe cleat and cycle pedal combination, wherein said cycle pedal has a first mating surface formed around a first axis, said first mating surface having a projection thereon, and wherein said shoe cleat is provided with a cleat body having a second mating surface, said second mating surface having a cavity therein provided with at least one limit surface defining an effective size of said cavity for receiving said projection, the improvement comprising:
said limit surface defining said effective size of said cavity for loosely receiving said projection; and
means extending through said cleat body and intersecting said limit surface for varying said effective size of said cavity.

16. In a shoe cleat and cycle pedal combination according to claim 15, the further improvement comprising:
said varying means comprising an aperture extending through said cleat body and intersecting said limit surface, a limit member received in said aperture and having a limit section extendable into said cavity, and means cooperating with said aperture and said limit member for adjustably holding said limit member in said aperture with said limit section extending a desired distance into said cavity to vary said effective size.

17. In a shoe cleat and cycle pedal combination according to claim 16, the further improvement comprising:
said holding means comprising female threads provided in said aperture, male threads provided on said limit member for rotatably engaging said female threads, and means received in said limit member externally of said shoe cleat for selectably rotating said limit member in said aperture to adjust the length of said limit section that extends into said cavity.

18. A cycle pedal system comprising:
a pedal body having first bearing surfaces concentric with a vertical axis;
a shoe cleat having second bearing surfaces concentric with said vertical axis;
said first and second bearing surfaces permitting relative rotary movement therebetween around said vertical axis;
said pedal body being provided with a first limit surface offset from one of said first bearing surfaces;
said shoe cleat being provided with a second limit surface offset from one of said second bearing surfaces;
said first limit surface and said second limit surface being separated by a first space of variable size to permit said relative rotary movement of said pedal body and said shoe cleat to be free for a variable arc of said relative rotary movement; and
an adjuster received in said shoe cleat and intersecting said respective first or second limit surface, said adjuster being effective to vary the size of said first space and control the amount of said variable arc.

* * * * *